United States Patent Office 3,227,400
Patented Jan. 4, 1966

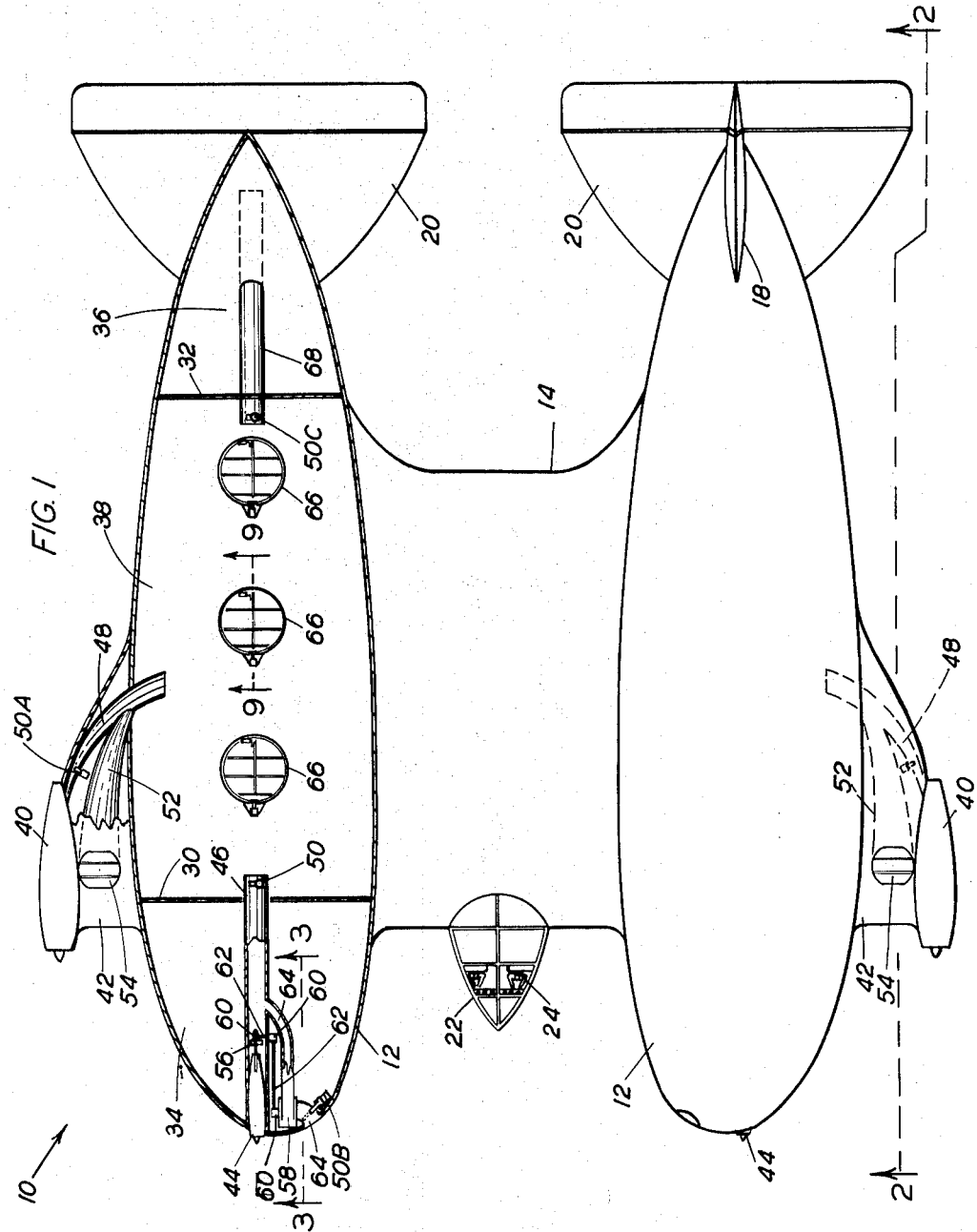

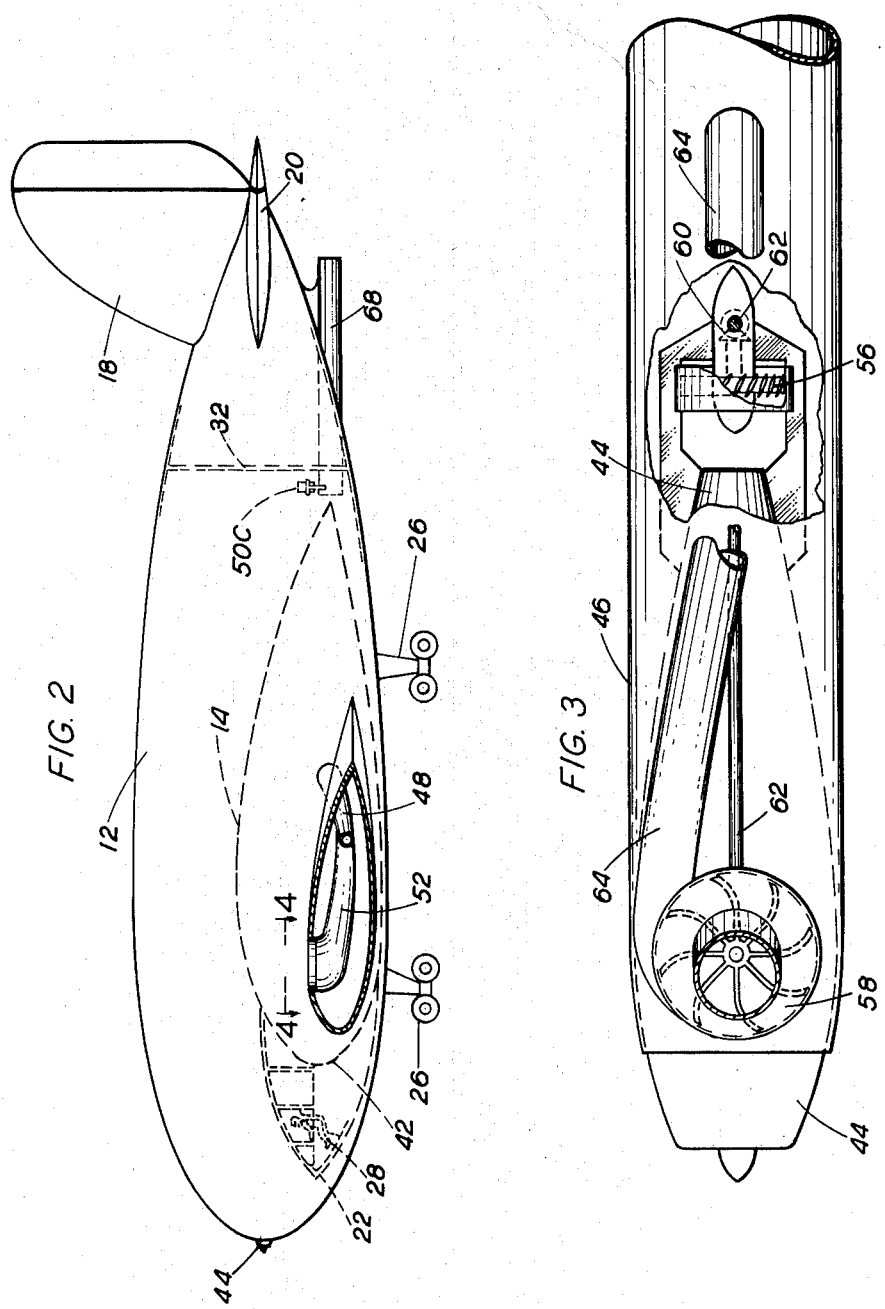

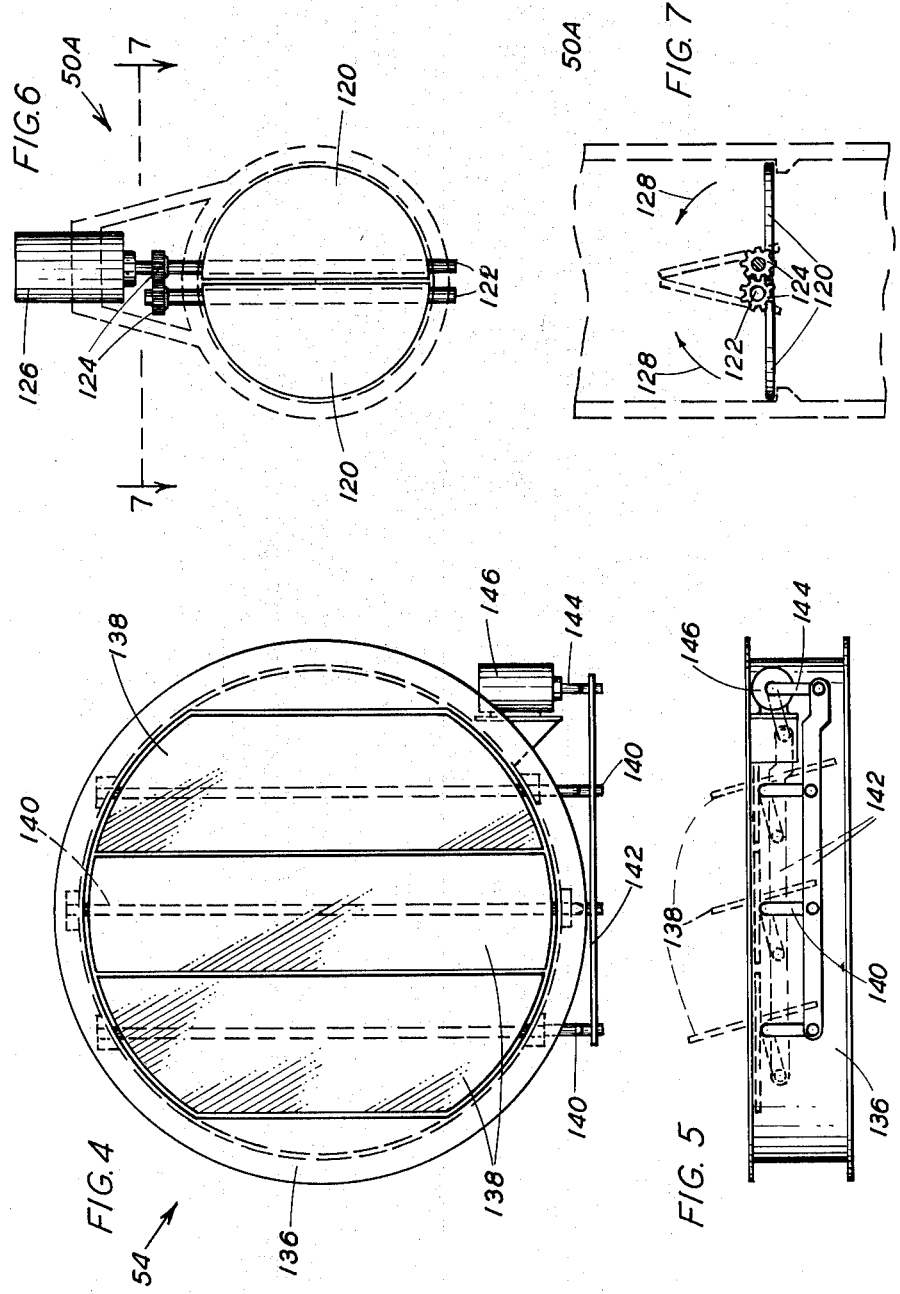

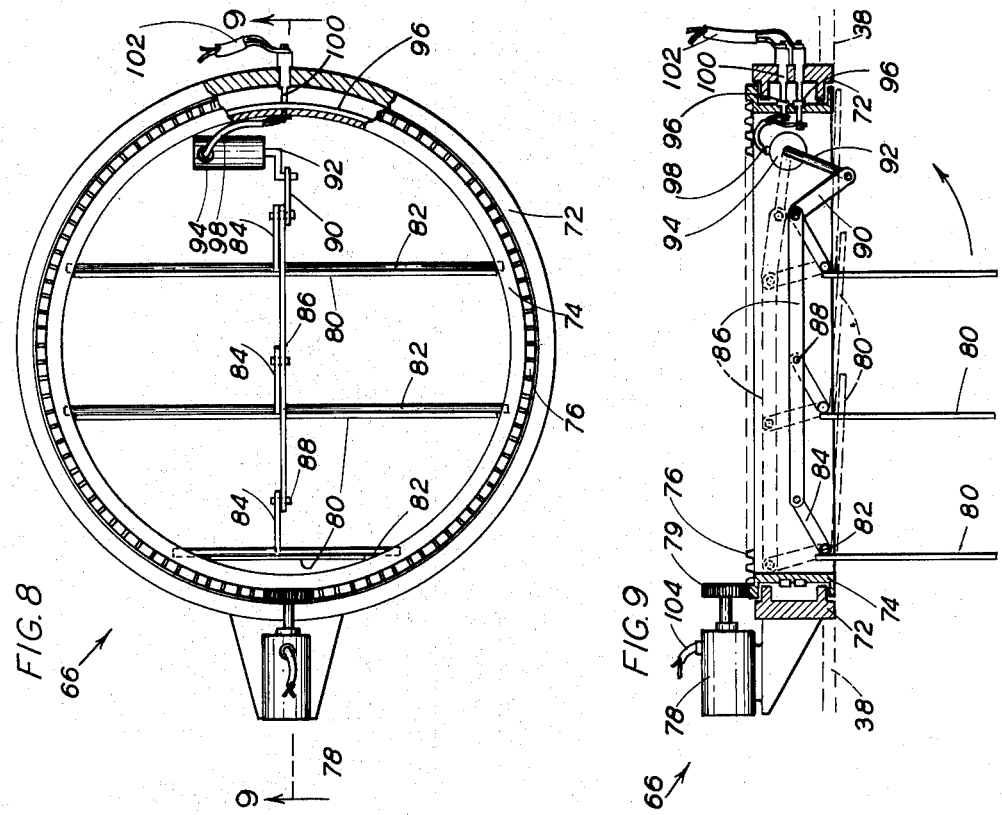

3,227,400
JET DIRIGIBLE
Bernhardt Stahmer, 1509 Chicago St., Omaha, Nebr.
Filed Nov. 12, 1963, Ser. No. 322,620
1 Claim. (Cl. 244—29)

This invention relates to jet aircraft and more particularly it is an object of this invention to provide a jet aircraft having a jet engine mounted to deliver hot exhaust gases into hot gas chamber for using the lifting effect of the hot gases to assist in maintaining aircraft aloft whereby it can carry heavy cargoes.

Still another object is to provide an aircraft as described which is provided with discharge ports on the underside of its gas chamber whereby the downward rush of gas from the discharge ports further tends to hold the aircraft aloft and to make it possible to lift heavy cargoes.

A particular object of the invention is to provide an aircraft as described which is provided with intake port means for external air which is mixed with the exhaust gases of a jet engine means in order to increase the body of the gases being delivered to the gas chamber, and to cool the gases from the jet engine whereby they can be entered into the gas chamber without damage to the structure thereof.

A further object is to provide means for regulating the flow of cooling air flowing toward a point of intermixture with air from the jet engine means.

A very important object is to provide intake means for cooling air is described, the air intake means facing upwardly whereby air drawn thereinto will be providing a lifting effect on the aircraft.

Still another object is to provide an aircraft as described having an exhaust for gas passing from said gas chamber, which directs the exhaust gas rearwardly for forward propulsion.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:
FIGURE 1 is a top plan view of the aircraft of this invention shown with the upper portion of one fuselage removed and other parts broken away.
FIGURE 2 is a sectional view of the aircraft of FIGURE 1 as seen along the line 2—2 of FIGURE 1, certain parts being shown in dotted lines.
FIGURE 3 is a sectional view taken along the line 3—3 of FIGURE 1 and showing a jet engine and air intake assembly only.
FIGURE 4 is an enlarged top plan view of one of the air-intake ports.
FIGURE 5 is a side elevation of the air intake port of FIGURE 4.
FIGURE 6 is an enlarged detailed top plan view of valve 50A of FIGURE 1 as seen from its rearward side.
FIGURE 7 is a sectional view taken along the line 7—7 of FIGURE 6.
FIGURE 8 is a top plan view showing an enlarged detail of one of the exhaust ports in the lower surface of each fuselage.
FIGURE 9 is a sectional view taken along the line 9—9 of FIGURE 8. It is also a sectional view with enlargement taken along the line 9—9 of FIGURE 1.

Referring to FIGURE 1, the aircraft or dirigible generally indicated at 10 is formed of two identical spaced apart fuselages 12 connected together by an airfoil-shaped cargo or passenger-carrying hull 14.

The interior construction of the fuselages is theoretically and diagrammatically illustrated.

The fuselages are identical in shape and equipment having fin and rudder surfaces 18 and stabilizer and elevator surfaces 20 linked in a conventional manner to the pilot's cabin 22 for directional control at higher aircraft speeds.

In FIGURE 2, landing gear struts and wheels are shown at 26 extending downward from the hull 14.

Pilots 28 are illustrated in FIGURE 1 in the cabin 22.

The interior of each fuselage 12 is divided by transverse vertical bulkheads 30 and 32 into three compartments, fore and aft compartments 34 and 36, each permanently filled with helium, and a middle or hot gas compartment 38 filled at times with hot gases generated by outboard or side jet propulsion engines 40 held by outboard supporting sections or strut sections 42 extending outwardly of the dirigible near the outer side of the said fuselage.

Each middle compartment 38 is filled at times with hot gases by one of two forward propulsion jet engines 44 positioned to exhaust into a transfer tube or round pipe 46.

Each of the transfer tubes 46 extends from the nose of the respective fuselage 12 through the compartment 34 and into the compartment 38, partially housing the jet engine 44 which latter is extended at its forward end outwardly of the tube 46.

As best shown by FIGURE 1, a curved gas diversion duct 48 within the outboard supporting section 42 has an outer end which opens into the exhaust end of the engine 40 and conducts away a part, but not all, of the exhaust gas, the remainder being thrown rearwardly for forward propulsion. The duct 48 is provided with a valve 50A adjacent thereto and having a closure portion which can extend into the compartment 38.

The valve 50A, when shut off, permits the entire exhaust of engine 40 to be thrown rearwardly.

The valve 50A is of a type which will later be described and will be shown in detail by FIGURES 6 and 7 and is used to control air or gas flow at four places in the fuselage 12 as will be later described.

In FIGURE 1 an air mixture duct 52 is shown which is also within the outboard section 42, the duct 52 joining the diversion duct 48. The air duct 52 extends forwardly to an upwardly opening shuttered air intake port 54 which latter is shown in detail in FIGURES 4 and 5 and will be later described.

Referring again to FIGURE 3 and to the forward jet engine 44, a turbine 56 is positioned within the transfer tube 46 immediately to the rear of the engine 44. The turbine 56 revolves an air blower 58 by means of three pair of right angle gears 60 and shafts 62, as best shown in FIGURES 1 and 3.

The air blower 58 has an air intake tube 64 extended through the nose of the fuselage 12 and an exhaust passageway 64 extends rearwardly therefrom opening into the transfer tube 46. The air intake 64 is provided with a valve 50B which is like the valve 50A and will be later described.

Summarizing the operation of the foregoing, hot gas from the side jet engine 40 is variably admitted into the compartment 38 as controlled by valve 50A, and is variably mixed with atmospheric air from the shuttered port 54 whereby the heat and volume of flow into the compartment 38 are controllable.

Similarly the forward jet engine 44 provides hot gas variably mixed with atmospheric air from the blower 58 as controlled by valve 50B.

The cooler and heavier portions of the jet gas air mixture settle to the lower part of the compartment 38, being released from the uselage 12 through downwardly opening gas discharge ports 66.

An elongated nozzle 68 extends from a lower part of the compartment 38 through the after compartment 36 and outwardly through the fuselage 12. The inner end of the nozzle 68 is within the compartment 38 and is provided with a valve 50C, as later described, whereby gas may be selectively released directly to the rear of the fuselage 12 for adding to the forward propulsion provided by the jet engine 40.

The gas discharge ports 66, as seen in detail by FIGURES 8 and 9, each have an outer ring 72 secured to the lower surface of the compartment 38 and an inner ring 74 provided with a circle of gear teeth 76 whereby the said inner ring 74 may be rotated by a geared electric motor 78 mounted to the outer ring 72 and connected to a gear 79 in mesh with teeth 76.

Three shutter vanes 80 are fixed to axle shafts 82 and extend across the inner ring 74 and are pivotally mounted on the inner ring 74.

The vanes 80 are adapted to be swung downward to the full line positions as shown, or up to the dotted line positions, as shown in FIGURE 9, by means now to be described.

Upwardly extended pivot arms 84 are each fixed to an axle 82 and are each connected to an actuating bar 86 by pivot pins 88. One end of the bar 86 is pivotally connected to a pitman arm 90 which latter is moved by a crank 92 of an electric motor 94 mounted on the inner ring 74.

Commutator rings 96 encircling the inner ring 74 are wired by wires 98 to the motor 94 and receive electric current from brushes 100 extended through the outer ring 72. Wires 102 are connected to the brushes 100 and lead to power supply means, not shown, controllable from the pilot's cabin 22.

The wires 102 and wires 104 of the gear motor 78 extend to current control means not shown in the pilots cabin 22 whereby the motor 94 may position the shutter 80 to direct gas exhausting from the compartment 38 directly down to assist in lifting the aircraft or to the rear to aid in forward propulsion, or to either side for sidewise movement of the aircraft.

Referring now to the valves 50A and 50B, as shown by the valve 50A in FIGURES 6 and 7, two semi-circular valve plates 120 are secured to axle shafts 122 and positioned within the tube or duct 48, previously described.

Outer ends of the shafts 122 extend through the tubular member 48 and are provided with gears 124 intermeshed with each other whereby an electric motor 126 attached to one of the shafts 122 can be caused to turn the valve plates 120 from the full line closed position in FIGURE 7 to the dotted line position in the direction of the arrows 128.

The motor 126 is energized from the pilots cabin 22 and in this manner gases or air may be variably passed or stopped from passing through the tubular member or duct 48 when the valve 50A is used.

The shuttered air intake port 54 of FIGURES 4 and 5 functions to variably admit atmospheric air or to stop air from entering and mixing with the hot gases in the gas diversion duct 48. The port 54 has a circular case 136, shutter plates 138 mounted to pivot on crank shafts 140, a crank throw 142 extended to a crank 144 of an electric motor 146. The motor 146 is controlled by cables not shown from the pilot's cabin 22.

In operation, the jet engines 40 deliver atmospheric gases to the compartment 38 and at the moment of take-off, the pilot closes the valve 50C in the elongated nozzle 68 and opens the three ports 66 to direct gas directly down, thus providing an upward thrust to the aircraft which is assisted by the lift of the lighter-than-air hot jet gases and the lift provided by the helium of the compartments 34 and 36, causing the aircraft to rapidly rise vertically off the ground. Turning the vanes 80 to direct air to either side would move the aircraft sidewise; or by turning the vanes 80 completely around, a rearward thrust is provided.

Atmospheric air from the blower 58 and air intake port 54 increases the mass of air going through the aircraft, and reduces temperature of the gases in compartment 38 so that the walls of compartment 38 are better able to withstand the heat. Jet exhaust gases themselves, when undiluted, are too hot to be practical to confine.

From the foregoing description, it is thought to be obvious that a jet dirigible constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

A jet aircraft having a chamber for receiving hot exhaust gases for using the lifting effect of the hot gases to assist in maintaining the aircraft aloft and to extend its cargo carrying capacity, jet engine means mounted on said aircraft, means for delivery exhaust gases from said jet engine means to said hot gas chamber, in further combination with chambers for receiving lighter than air gases for further assisting the lofting of said aircraft, said lighter than air gas chambers being partitioned from said hot gas chamber, and in which one of said lighter than air gas chambers is disposed at the rearward end of said aircraft and further in which said hot gas chamber is disposed forwardly of said one lighter than air gas chamber and in which a tube extends from said hot gas chamber through said one lighter than air gas chamber and opens at the rear of said aircraft whereby hot gases in said hot gas chamber can pass through said tube and exhaust rearwardly from providing said aircraft with forward motion from the jet effect thereof.

References Cited by the Examiner

UNITED STATES PATENTS

| | | | |
|---|---|---|---|
| 1,729,020 | 9/1929 | Szymenski | 244—97 |
| 1,833,033 | 11/1931 | Ortega | 244—25 |
| 2,180,036 | 11/1939 | Dardel | 244—97 |
| 2,428,656 | 10/1947 | Elliot | 244—97 |
| 2,599,241 | 6/1952 | Farmers | 244—97 |
| 3,053,483 | 9/1962 | Stahmer | 244—29 |
| 3,120,932 | 2/1964 | Stahmer | 244—31 X |

OTHER REFERENCES

Flight, "Modern Montgolfier," vol. 60, Issue 2232, page 560, Nov. 2, 1951.

MILTON BUCHLER, *Primary Examiner.*

FERGUS S. MIDDLETON, *Examiner.*